United States Patent [19]
Miyazaki et al.

[11] Patent Number: 5,477,288
[45] Date of Patent: Dec. 19, 1995

[54] CAMERA HAVING TRIMMING FUNCTION

[75] Inventors: Takemi Miyazaki; Kazuhiro Nakanishi; Yoshio Kakuta; Noriyuki Kaedeoka; Toshiki Fujisawa, all of Hachioji, Japan

[73] Assignee: Konica Corporation, Tokyo, Japan

[21] Appl. No.: 183,438

[22] Filed: Jan. 19, 1994

[30] Foreign Application Priority Data

Jan. 25, 1993 [JP] Japan .................................. 5-028536
Jan. 25, 1993 [JP] Japan .................................. 5-028537

[51] Int. Cl.$^6$ .......................... G03B 1/12; G03B 13/10; G03B 17/24
[52] U.S. Cl. ...................... 354/106; 354/173.1; 354/187; 354/195.1; 354/199; 354/214; 354/222
[58] Field of Search .................................. 354/105, 106, 354/173.1, 173.11, 187, 195.1, 199, 200, 201, 212, 214, 219, 222, 224, 225, 195.12

[56] References Cited

U.S. PATENT DOCUMENTS

| | | | |
|---|---|---|---|
| 5,036,346 | 7/1991 | Hatamori et al. | 354/199 |
| 5,097,279 | 3/1992 | Sakamoto et al. | 354/106 |
| 5,270,755 | 12/1993 | Ohno et al. | 354/106 |
| 5,291,233 | 3/1994 | Hashimoto et al. | 354/195.12 |

OTHER PUBLICATIONS

U.S. patent application Ser. No. 08/110,657, abandoned in favor of continuation Ser. No. 08/315676.

*Primary Examiner*—A. A. Mathews
*Attorney, Agent, or Firm*—Finnegan, Henderson, Farabow, Garrett & Dunner

[57] ABSTRACT

A camera having a trimming function capable of recording trimming information includes a lens barrel having a picture-taking lens capable of moving between protruding and retracting positions, a lens barrel driver to drive the lens barrel, a zoom viewfinder driver to change a magnification of the viewfinder, a film winder to winding a photographic film, a film rewinder to rewind the film, a motor to feed the film. The camera further includes a driver to drive the film winder when the motor is forwardly rotated, and also to drive the film rewinder or the zoom viewfinder driver when the motor is reversely rotated, and a switch to switch over between the zoom viewfinder driver and the film rewinder in accordance with a position of the lens barrel. The camera yet further includes a controller to activate the film rewinder by the reverse rotation of the motor when the lens barrel is located in a retracting position, and also to activating the zoom viewfinder driver by the reverse rotation of the motor when the lens barrel is located in a protruding position.

16 Claims, 17 Drawing Sheets

CAMERA HAVING TRIMMING FUNCTION

BACKGROUND OF THE INVENTION

The present invention relates to a camera having a trimming function in which a photographic image region is set by a pseudo zooming means and the trimming information that has been set is optically or magnetically recorded on a film.

In a conventional camera having a trimming function, the trimming information is recorded on a film in the following manner:

The conventional camera having a trimming function includes, for example, a picture-taking lens of single focus and a zoom viewfinder by which the viewfinder magnification can be changed. A photographer selects a desired photographing range through this zoom viewfinder, and conducts a release operation so as to expose a film surface. Then, the trimming information representing an exposure image region corresponding to a visual field of the zoom viewfinder is recorded on a film.

The trimming information has is recorded on the film after the film has been recorded, and the recorded trimming information is read out by a printer. According to this information, trimming is automatically conducted during the printing process.

In a conventional camera having a zoom lens, the viewfinder magnification is changed being linked with the zoom drive operation of a picture-taking lens. However, in the case of a camera having a trimming function in which only a picture-taking lens of single focus is provided, the driving operation for variable magnification of a viewfinder must be conducted separately from the operation of zoom driving of the picture-taking lens. Therefore, it is necessary to provide an exclusive drive source for driving the zoom viewfinder. For this reason, the cost is increased, and further a large arrangement space is required, which results in an increase of the size of the camera.

In the camera having a trimming function as described above, when a large number of setting positions are provided for trimming photography in a pseudo zoom region, an amount of trimming information to be recorded on a film surface is increased. For example, as disclosed in U.S. patent application Ser. No. 08/110657 applied by the present applicant, in a system where the print information is digitally recorded outside of a film image surface in the form of optical information, an amount of information to be recorded can not be sufficiently increased because of the restriction of the capacity of an information recording unit or an information reading unit.

In order to solve the above problem, several trimming photographing positions are provided stepwise and can be selected in advance. In this type of camera in which the trimming region can be changed stepwise, when the visual field is selected through a zoom viewfinder, the trimming photographing positions are limited. Therefore, it is difficult for a photographer to acquire a desirable trimming photographing position.

SUMMARY OF THE INVENTION

The first object of the present invention is to provide a camera having a trimming function characterized in that: a zoom finder can be driven without using an exclusive drive source; the structure is simple, so that a sufficient arrangement space is provided; and the camera size can be reduced.

The second object of the present invention is to provide a camera having a trimming function in which a desired photographing field angle can be easily provided.

The present invention is to provide a camera having a trimming function capable of recording trimming information, comprising: a lens barrel having a picture-taking lens capable of moving between protruding and retracting positions; a lens barrel drive means for driving the lens barrel; a zoom viewfinder drive means for changing the finder magnification; a film winding means for winding a film; a film rewinding means for rewinding the film; a film feed motor; a drive means for driving the film winding means when the motor is forwardly rotated, and also for driving the film rewinding means or the zoom finder drive means when the motor is reversely rotated; a switching means for switching between the zoom finder drive means and the film rewinding means in accordance with a position of the lens barrel; and a control means for activating the film rewinding means by the reverse rotation of the film feed motor when the lens barrel is located in a retracting position, and also for activating the zoom viewfinder drive means by the reverse rotation of the film feed motor when the lens barrel is located in a protruding position.

According to the present invention, a drive force generated by one motor is used for winding and rewinding a film, and also used for driving a zoom viewfinder for the purpose of variable magnification. The present invention is comprised of a switching means for switching between the film winding drive and the variable magnification drive of the viewfinder according to a position of the lens barrel. When the lens barrel is in a protruding position, the motor drives the zoom viewfinder so that a variable magnification operation can be performed, and when the lens barrel is in a retracting position, the motor rewinds the film.

Further, when the lens barrel is in the protruding position, it is possible to drive another member by the motor, for example, it is possible to set a visual field frame of the viewfinder corresponding to several photographing formats (full size, panorama size, and high vision size). Alternatively, it is possible to set an exposure frame corresponding to several photographing formats.

Further, the present invention is to provide a camera having a trimming function capable of recording trimming information, comprising: a zoom viewfinder; a changing means for successively changing a trimming photographing position in accordance with a plurality of trimming photographing positions previously determined in a variable magnification region of the zoom viewfinder, and also in accordance with the operation of a selecting button for selecting a trimming range; and a zoom viewfinder drive means for changing the magnification of the zoom viewfinder so that a visual field can be formed in accordance with the trimming photographing position determined by the changing means, and also for stopping the change in the zoom viewfinder magnification in the proximity of the trimming range, and also for driving under the condition of a small change in the magnification.

According to the present invention, a desired viewfinder magnification can be easily set when the variable magnification operation is temporarily stopped in the proximity of the trimming photographing position or when the variable magnification is reduced in the variable magnification range of the zoom viewfinder.

BRIEF DESCRIPTION OF THE DRAWINGS

In the detailed description of the preferred embodiments of the invention presented below, reference is made to the accompanying drawings in which.

DETAILED DESCRIPTION OF THE PREFERRED EMBODIMENTS

With reference to the accompanying drawings, an embodiment of the camera having a trimming function of the present invention will be explained in detail as follows.

Figure 1:
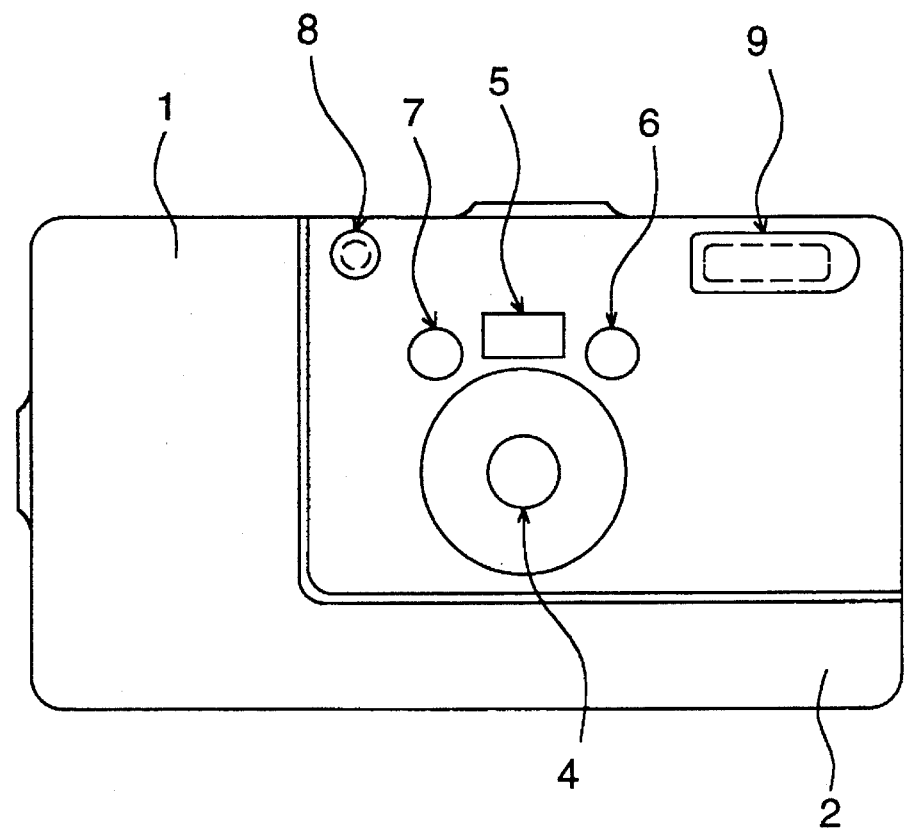
FIG. 1 is a front view of a camera having a trimming function.

As shown in FIG. 1, the camera having a trimming function includes a front cover 1, decorative panel and rear cover 3. At the center of the decorative panel 2, a picture-taking lens 4 of a single focus is provided so that the picture-taking lens 4 can be protruded and retracted. A zoom viewfinder 5, the magnification of which can be changed, is provided above the picture-taking lens 4. A light projecting window 6 is disposed on one side of the zoom viewfinder 5, and a light receiving window 7 is disposed on the other side. A photometry window 8 is disposed above the light receiving window 7. A strobe light emitting window 9 is disposed on the left of the light projecting window 6. This strobe light emitting window 9 is located distant from the picture-taking lens 4 so that the photography is not affected by the strobe light.

Figure 2:
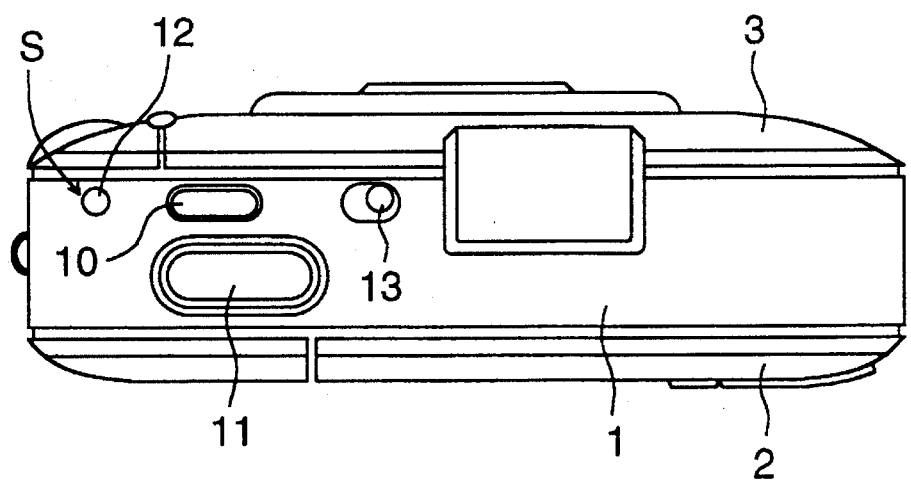
FIG. 2 is a plan view of the camera having a trimming function.
Figure 3:
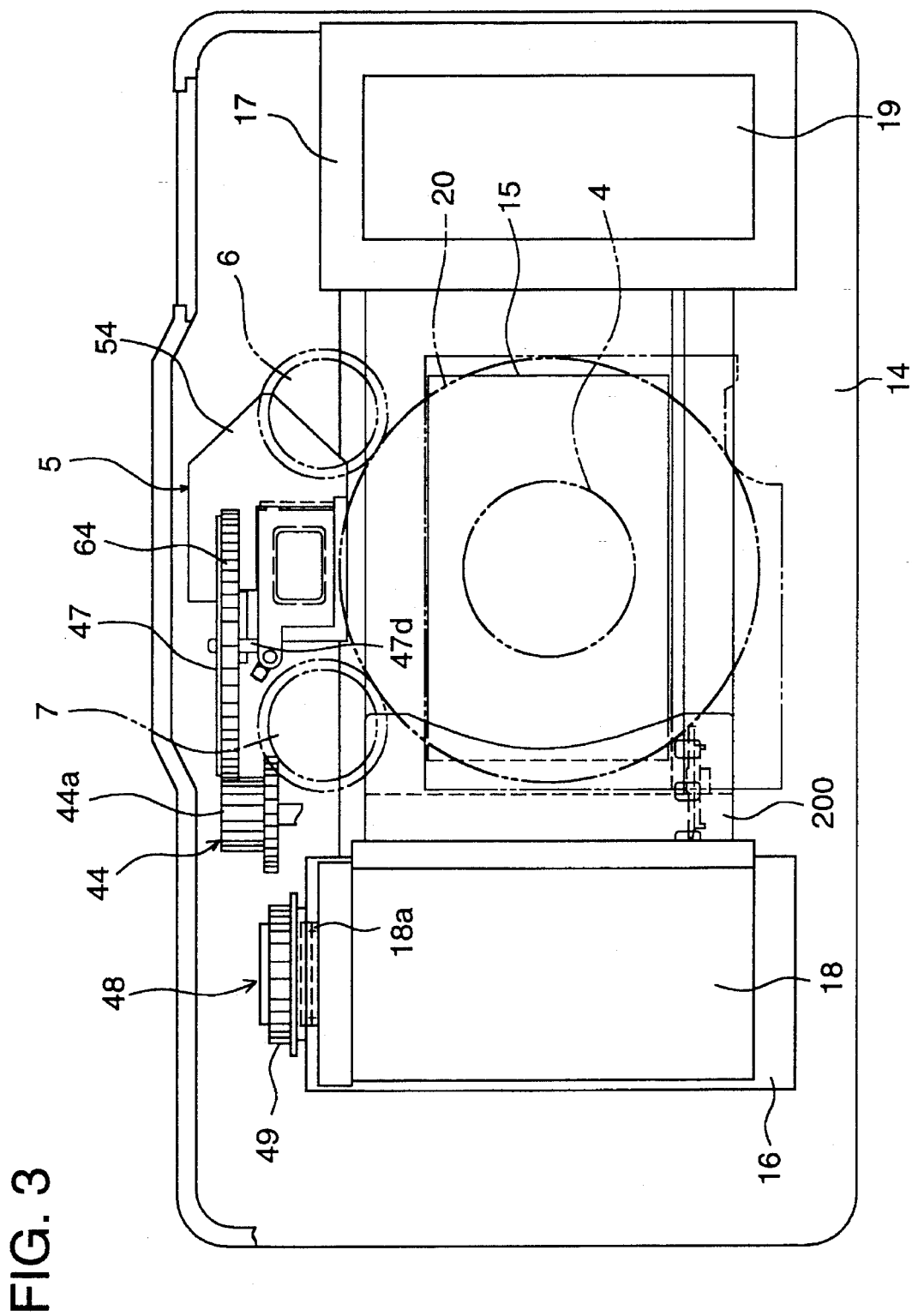
FIG. 3 is a front view of the camera having a trimming function under a condition that a front cover of the camera is taken off.
Figure 4:
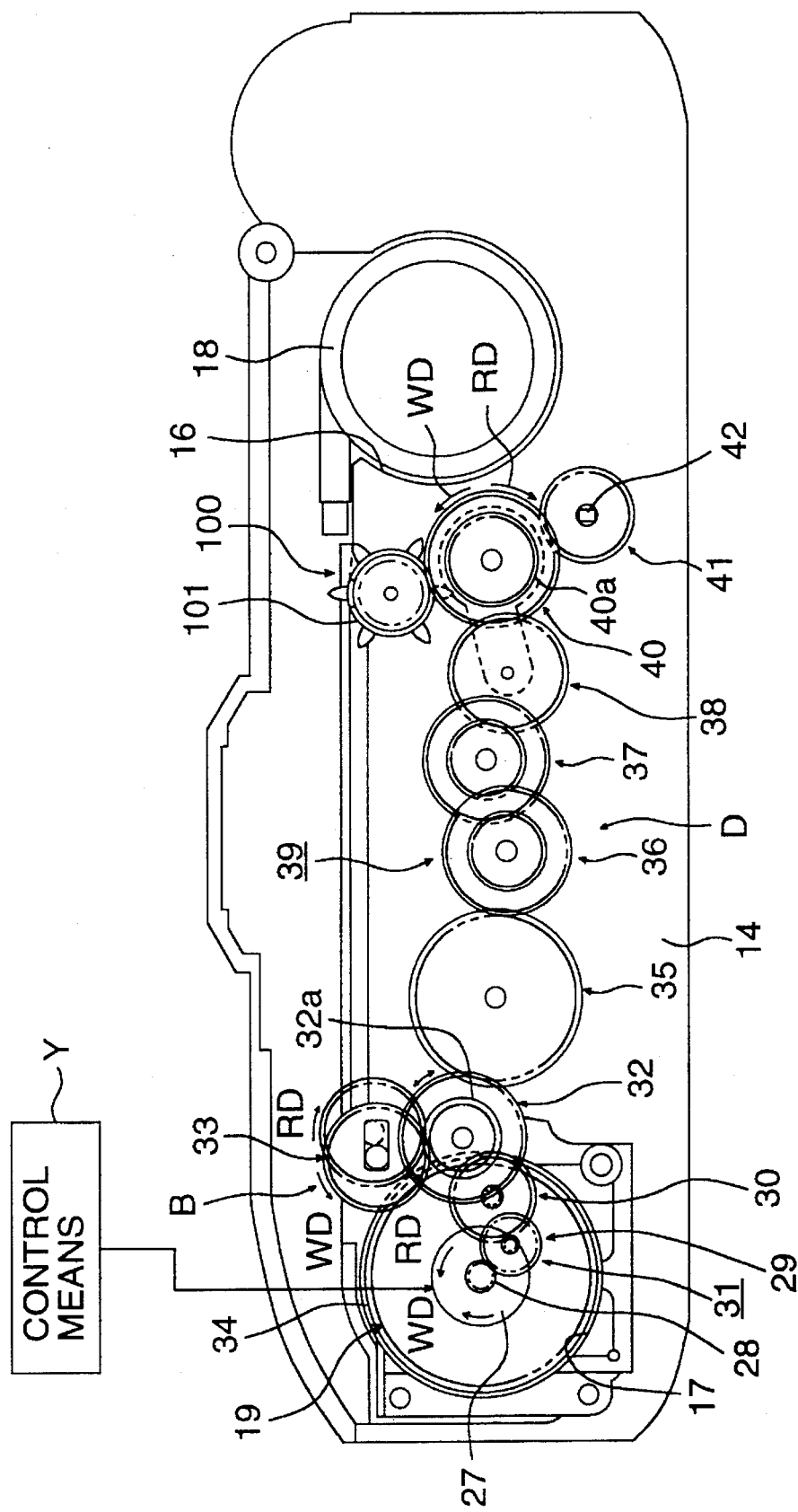
FIG. 4 is a bottom view of the camera having a trimming function showing a film feed means.
Figure 5:
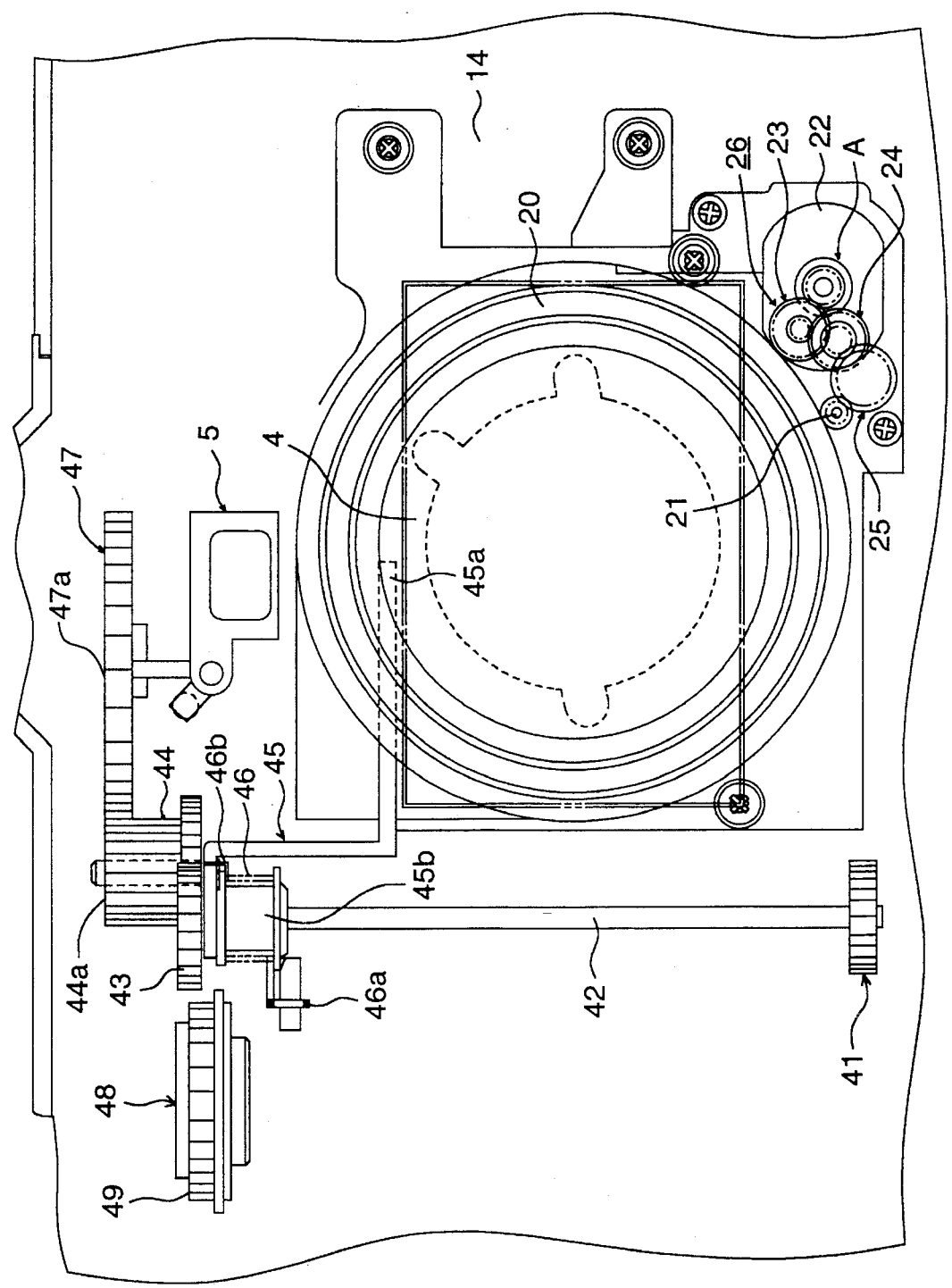
FIG. 5 is a front view of the camera having a trimming function showing a switching means.
Figure 6:
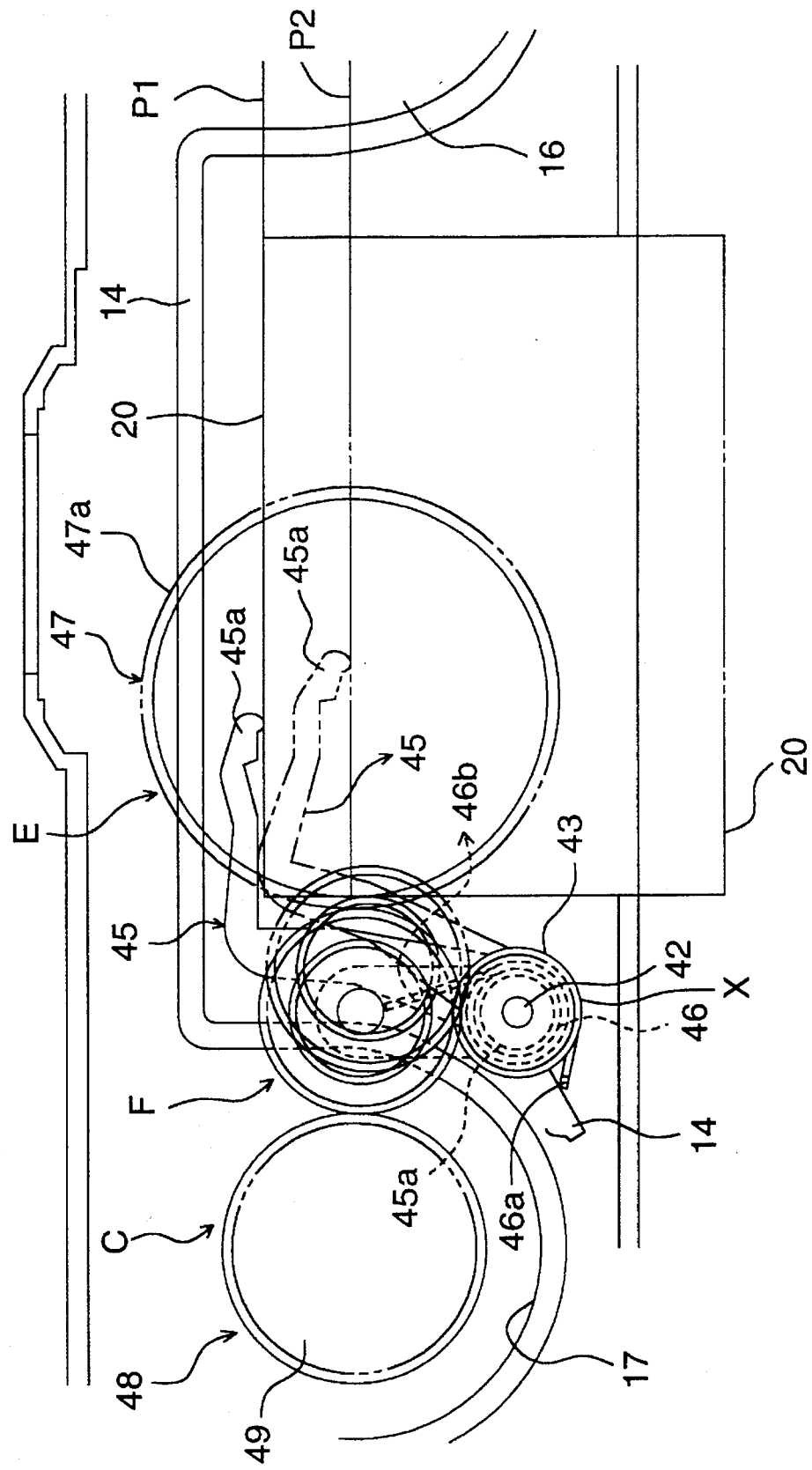
FIG. 6 is a plan view of the camera having a trimming function showing the switching means.
Figure 7:
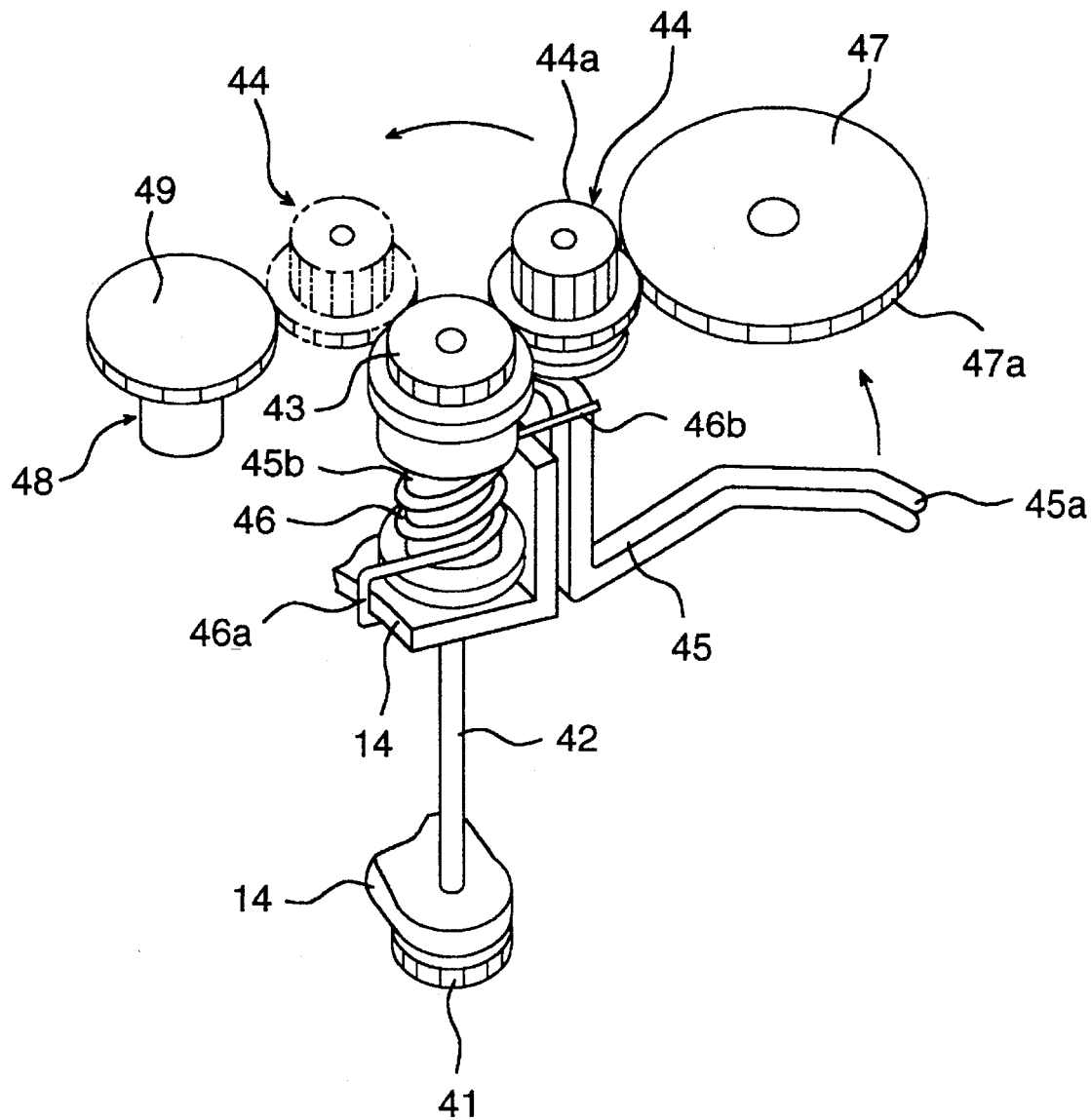
FIG. 7 is a perspective view of the camera having a trimming function showing the switching means.

As illustrated in FIG. 2, the front cover 1 disposed in the upper portion of the camera having a trimming function includes a main switch 10, release switch 11, zoom switch 12, and rewinding switch 13. When the zoom switch 12 is operated, the magnification of the zoom viewfinder 5 is changed, so that an image region to be printed after trimming is indicated by a viewfinder frame. In this way, the trimming range is indicated. This zoom switch 12 composes a trimming range selection button S.

A camera body 14 of the camera having a trimming function is covered with the front cover 1, decorative panel 2 and rear cover 3. As illustrated in FIGS. 3 to 8, a film magazine chamber 16 and a film winding chamber 17 are provided on both sides of a photographing image frame 15. A film magazine 18 is accommodated in this film magazine chamber 16, and a film 200 is wound by a spool 19 provided in the film winding chamber 17.

A lens barrel 20 is provided in the front of the photographing image frame 15 of the camera body 14 in such a manner that the lens barrel 20 can be protruded and retracted. The picture-taking lens 4 of single focus is provided in this lens barrel 20. The lens barrel 20 is supported by a drive shaft 21 provided in the camera body 14. When this drive shaft 21 is rotated by a lens barrel drive motor 22 disposed in the camera body 14 through a gear train 26 composed of gears 23, 24, 25, the lens barrel 20 is protruded to a protruding position P2 from an accommodating position P1, and also the lens barrel 20 is retracted to the accommodating position P1 from the protruding position P2. These drive shaft 21, lens barrel drive motor 22 and gear train 26 compose a lens barrel drive means A which protrudes and retracts the lens barrel 20.

A film feed motor 27 is disposed inside the winding spool 19. When a pinion 28 of this film feed motor 27 is rotated in a winding direction (referred to as W.D in this specification), this torque is transmitted to a gear train 31 composed of gears 29, 30. In this case, a sun gear 32 drives a gear train 39 composed of gears 35, 36, 37, 38, so that the torque is transmitted to a planetary gear 40. A gear 40a of this planetary gear 40 is meshed with a winding gear 101 mounted on a shaft of a sprocket 100. Since the sprocket 100 is engaged with the perforations of a film 200 provided in the film magazine 18, when the sprocket 100 is rotated by the gear, the film 200 is pulled out and fed from the film magazine. Since a planetary gear 33 is meshed with a winding gear 34 disposed below the winding spool 19, the film 200 is wound by the winding spool 19. These planetary gear 33, winding gear 34 and winding spool 19 compose a film winding means B which winds the film 200.

When the pinion 28 of the film feed motor 27 is rotated in a rewinding direction (referred to as R.D in this specification), the torque of the motor drives the gear train 31 composed of the gears 29, 30. When this torque is applied, the planetary gear 33 is disengaged from the winding gear 34, so that the sun gear 32 drives the gear train 39 composed of the gears 35, 36, 37, 38, and this torque is transmitted to the planetary gear 40.

Since the gear 40a of the planetary gear 40 is meshed with a lower side rewinding gear 41, the lower side rewinding gear 41 is rotated. These film feed motor 27, gear trains 31, 39, sun gear 32 and planetary gear 40 composes a film feed means D which is connected with the film winding means B and film rewinding means C in accordance with a rotational direction of the film feed motor 27.

The lower rewinding gear 41 is disposed in a lower portion of the rewinding shaft 42. This rewinding shaft 42 is disposed in an axial direction of the film magazine, and an upper rewinding gear 43 is provided in an upper portion of the rewinding shaft 42. This upper rewinding gear 43 is meshed with a planetary gear 44. This planetary gear 44 is rotatably supported by an interlocking lever 45. This interlocking lever 45 is rotatably supported by the rewinding shaft 42. A fore end 45a of the interlocking lever 45 comes into contact with a rear end portion of the lens barrel 20. A coil spring 46 is provided in a shaft portion 45b of the interlocking lever 45 into which the rewinding shaft 42 is inserted. One end portion 46a of the coil spring 46 is engaged with the camera body 14, and the other end portion 46b is engaged with the interlocking lever 45. Therefore, the gear 44a of the planetary gear 44 is always pushed in a direction so that the gear 44a can be meshed with a gear 47a of a viewfinder cam 47.

In the case where the lens barrel 20 having the picture-taking lens 4 is located at the accommodating position P1, the interlocking lever 45 is pushed by the lens barrel 20, resisting a force given by the coil spring 46, so that the planetary gear 44 is meshed with a rewinding gear 49 of a rewinding unit 48. In this way, the rewinding unit 48 is set in a rotatable condition, and when this rewinding unit 48 is rotated, the shaft 18a of the film magazine 18 is rotated, so that the film 200 is rewound. In this case, the lower rewinding gear 41, rewinding shaft 42, upper rewinding gear 43 and rewinding unit 48 compose the film rewinding means C by which the film 200 is rewound.

On the other hand, when the lens barrel 20 having the picture-taking lens 4 is protruded to the protruding position P2 from the accommodating position P1, the gear 44a of the planetary gear 44 is meshed with the gear 47a of the finder cam 47 by the action of the coil spring 46. Therefore, the viewfinder cam 47 of the zoom viewfinder 5 can be rotated. These planetary gear 44, interlocking lever 45 and coil spring 46 compose a switching means F which connects the film feed means D with the zoom viewfinder drive means E when the lens barrel 20 is protruded, and also connects the film feed means D with the film rewinding means C when the lens barrel 20 is retracted. When the lens barrel 20 is protruded, this switching means F connects the film feed means D with the zoom viewfinder drive means E, so that the zoom viewfinder 5 can be driven. In the case where the lens barrel 20 is retracted, the switching means F connects the film feed means D with the film rewinding means C, so that the film can be rewound.

As described above, when the film feed motor 27 is forwardly rotated, the film winding means B is operated by a drive means X, and when the film feed motor 27 is reversed, the film rewinding means C or the zoom viewfinder drive means E is operated by the drive means X. In accordance with a position of the lens barrel 20, the connection is switched between the zoom viewfinder drive means E and the film rewinding means C by the switching means F. When the lens barrel 20 is located at the accommodating position P1, the film rewinding means C is operated by the reverse rotation of the film feed motor 27. When the lens barrel 20 is located at the protruding position P2, the zoom viewfinder drive means E is operated by the reverse rotation of the film feed motor 27 being controlled by the control means Y. The apparatus of the invention includes the aforementioned drive means X, the switching means F and the control means Y. That is, the operations of film winding, film rewinding and variable magnification driving of the zoom viewfinder 5 are conducted by one motor. The switching means F switches between the operations of the film rewinding drive and the variable magnification drive of the zoom viewfinder 5 in accordance with the position of the lens barrel 20. When the lens barrel 20 is located at the protruding position P2, the variable magnification operation can be conducted on the zoom viewfinder 5 by the motor, and when the lens barrel 20 is located at the accommodating position P1, the film can be rewound by the motor.

Accordingly, when the lens barrel 20 is protruded, the drive means X having the motor and the zoom viewfinder drive means E can be connected by the action of the switching means F. Therefore, the operation of variable magnification can be conducted on the zoom viewfinder 5 when the drive means X is activated. When the lens barrel 20 is retracted, the drive means X and the rewinding means C can be connected by the action of the switching means F. Therefore, the film can be rewound when the drive means X is activated. Consequently, it is not necessary to provide an exclusive drive source for the zoom viewfinder 5, and the dimensions of the apparatus can be reduced.

The film feed mechanism is disposed astride the exposure image surface, and the lens barrel is constructed in such a manner that it can be protruded and retracted in the front of the exposure surface. Accordingly, the lens barrel 20 and the film feed mechanism are located very close to each other. Therefore, when a portion of the drive means X is activated by the movement of the lens barrel 20, the connection of the drive system X is changed, and a switching operation can be effectively performed between the film rewinding drive and the zoom viewfinder drive. Further, the film rewinding drive is conducted only when the lens barrel 20 is disposed in a retracting position. Therefore, a photographer can easily recognize the completion of photography.

Figure 8:
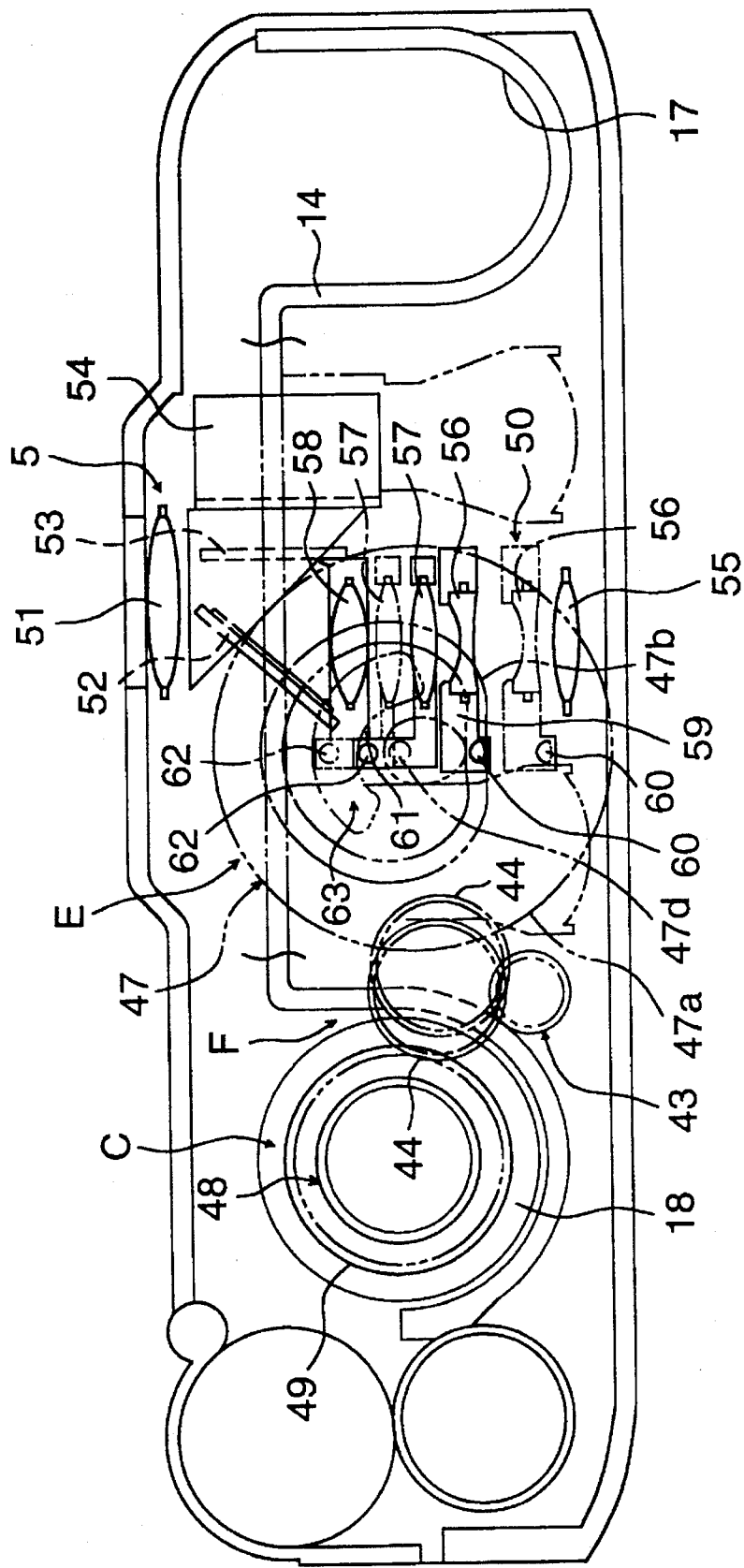
FIG. 8 is a plan view of the camera having a trimming function showing a viewfinder drive means.
Figure 9:
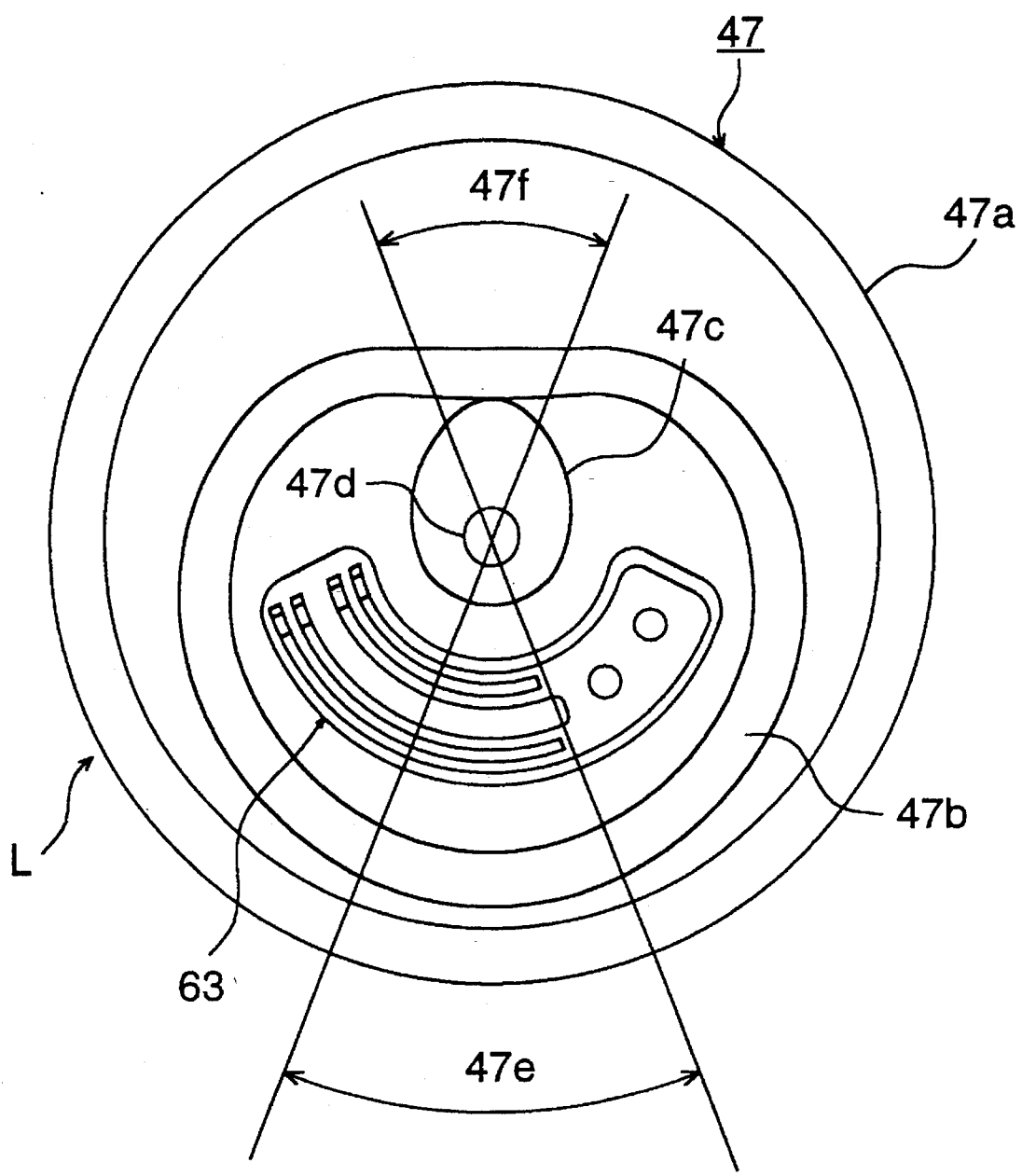
FIG. 9 is a view showing a viewfinder cam by which the magnification of a zoom viewfinder is changed.

As illustrated in FIGS. 8 and 9, the zoom viewfinder 5 includes a mirror 52, an optical member 53 forming a focal surface of the objective lens 50, and a prism 54, which are disposed between the objective lens 50 and the ocular eyepiece. The objective lens 50 includes a convex lens 55, first moving lens 56, second moving lens 57, and convex lens 58. The first moving lens 56 is held by a holding frame 59, and a pin 60 is mounted on the holding frame 59. The pin 60 is engaged with a first moving lens cam 47b of the viewfinder cam 47. The second moving lens 57 is held by a holding frame 61, and a pin 62 is mounted on the holding frame 61. The pin 62 is engaged with a second moving lens cam 47c of the viewfinder cam 47. The viewfinder cam 47 is rotated around a a shaft portion 47d. When this viewfinder cam 47 is rotated, the first moving lens 56 engaged with the first moving lens cam 47b, and the second moving lens 57 engaged with the second moving lens cam 47c, are linked with each other and moved on the optical axis.

Figure 10:
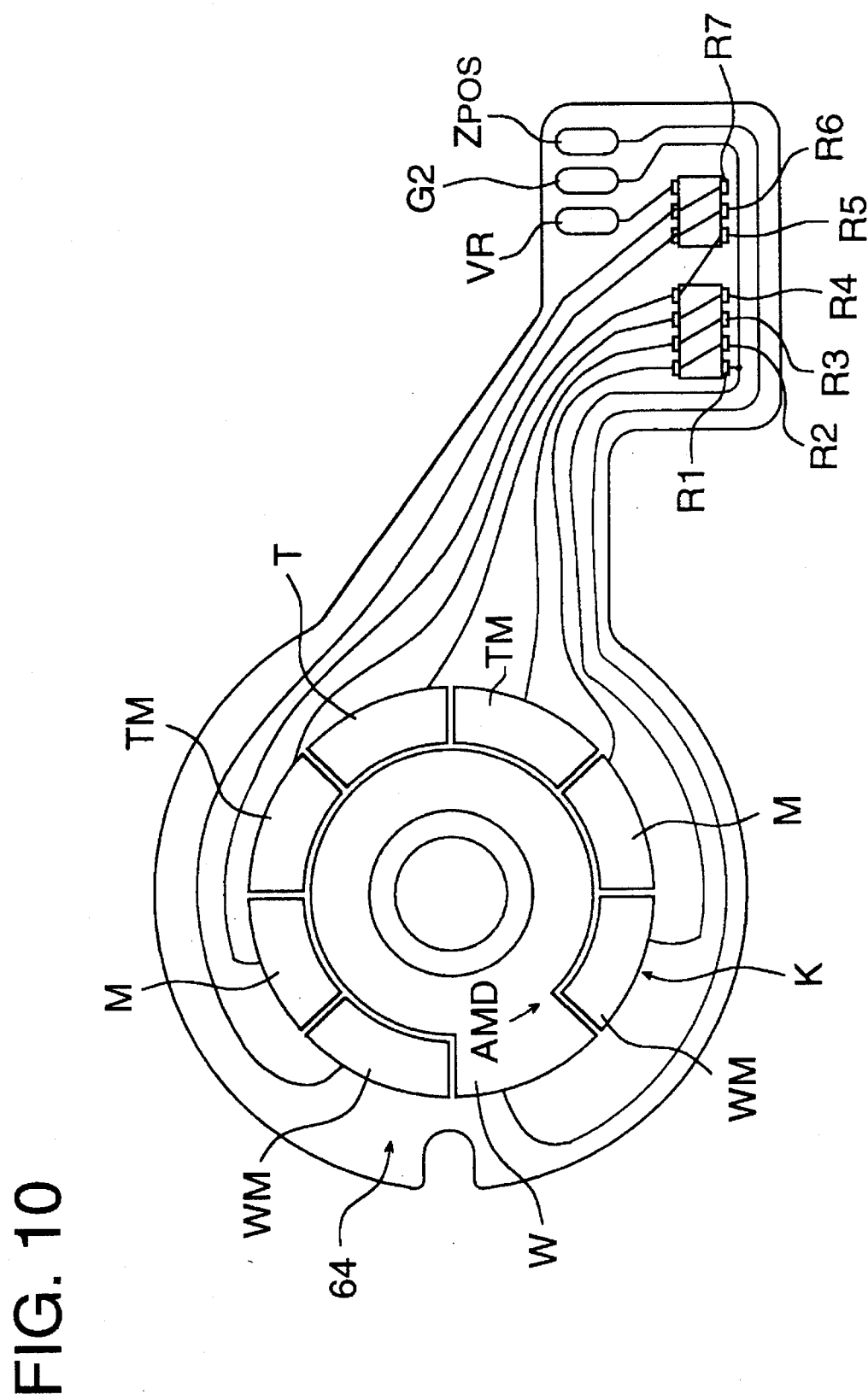
FIG. 10 is a plan view of a zoom viewfinder detection base plate.
Figure 11:
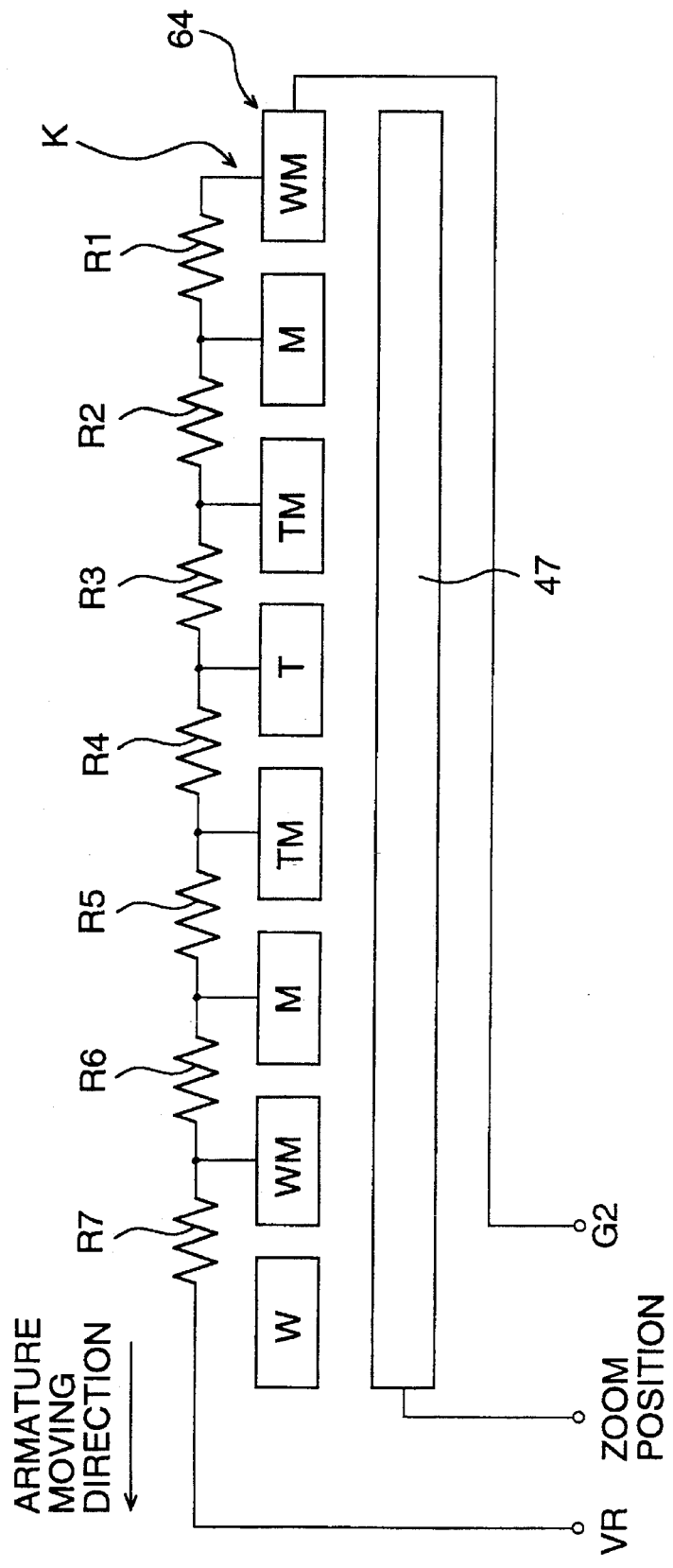
FIG. 11 is a circuit diagram for detecting the zoom viewfinder.

As illustrated in FIGS. 9 to 11, an armature 63 is provided on an upper surface of the viewfinder cam 47, and further a viewfinder detection base plate 64 is provided being opposed to the upper surface of the viewfinder cam 47. This viewfinder detection base plate 64 includes wiring patterns of wide W, wide middle WM, middle M, tele-middle TM, tele T, tele-middle TM, middle M and wide middle WM. As described above, a plurality of trimming photographing positions K are previously determined in the variable magnification region of the zoom viewfinder 5. Resistors R1 to R7 are respectively connected between these wiring patterns. By the communication of the armature 63 of the viewfinder cam 47, the resistance of a wiring pattern is changed, and the viewfinder magnification is changed in accordance with a rotational position of the viewfinder cam 47. Due to the foregoing, the trimming photographing position K is successively switched in accordance with the operation of the zoom switch 12 composing the trimming range selection bottom S. In the aforementioned manner, the changing means L is constructed. A change in the viewfinder magnification is small at a position close to Wide 47e of the first moving lens cam 47b of the viewfinder cam 47, and also at a position close to Wide 47f of the second moving lens cam 47c. Consequently, the operation can be accurately stopped at the initial position of Wide. The zoom viewfinder drive means E switches the magnification of the zoom viewfinder 5 so that a visual field corresponding to the trimming photographing position K determined by this changing means L can be formed. At the same time, the zoom viewfinder drive means E is constructed in such a manner that a change in the viewfinder magnification is stopped or reduced at a position close to the trimming range.

Figure 12:
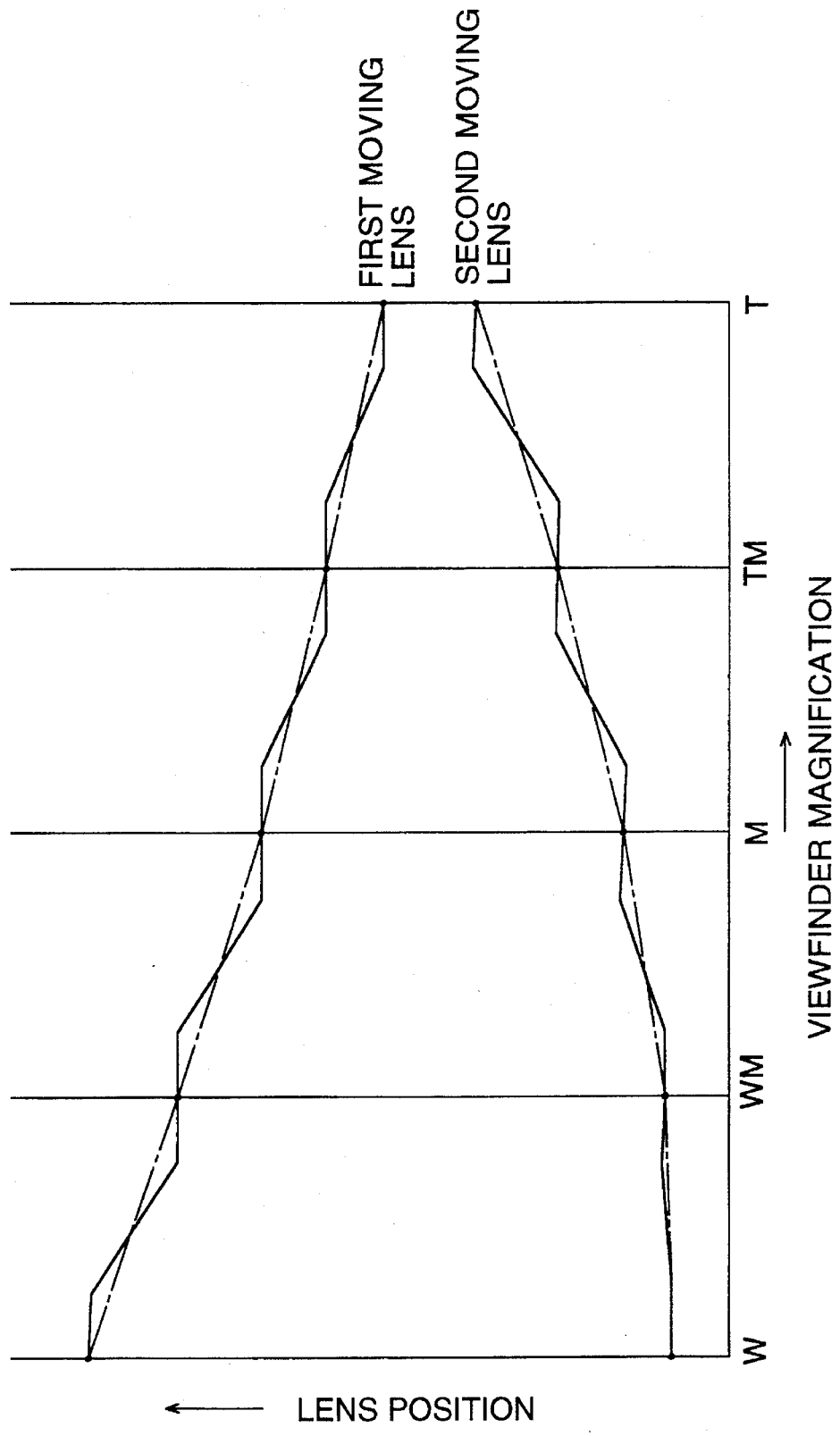
FIG. 12 is a cam diagram of the zoom viewfinder.
Figure 13:
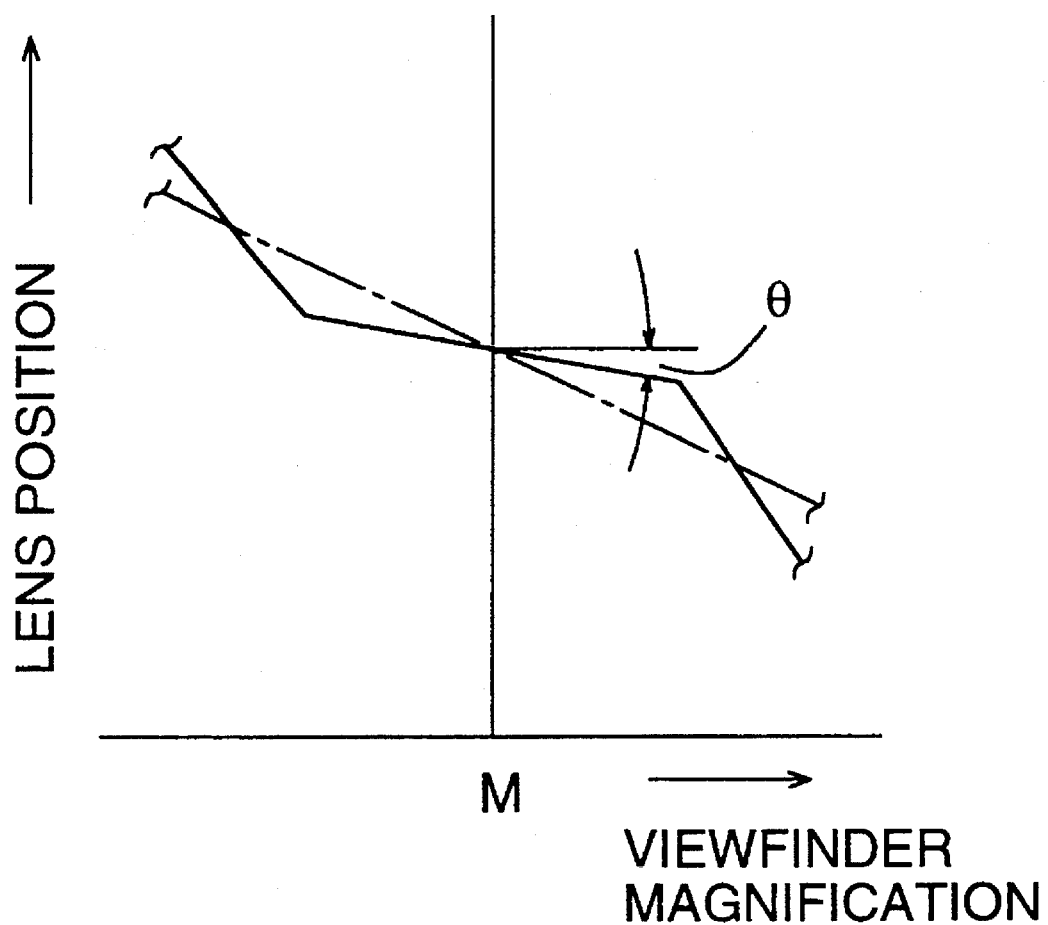
FIG. 13 is an enlarged view of the cam diagram of the zoom viewfinder.

FIG. 12 shows a configuration of the cam in which 5 focal distances are set from "wide" to "tele". The one-dotted chain line represents a viewfinder-cam diagram corresponding to the zoom of the picture-taking lens, and the solid line represents a cam diagram of the embodiment of the present invention. FIG. 13 is a partially enlarged view of FIG. 12. In the case where q=0, the viewfinder magnification is not changed. A change in the viewfinder magnification is reduced or eliminated with respect to, all the set focal distances, and the wide, middle and tele positions which are frequently used, and further with respect to the initial positions (for example, the wide position).

When the zoom stop positions are discontinuously set, especially when the intervals of the zoom stop positions are long, it is not sufficient that the zoom switch 12 is turned off after a desired photographing visual angle has been confirmed in the viewfinder, because the time is delayed at which the zoom switch is turned off so that the picture-taking lens is started to the next zoom position. However, in this example, the zoom viewfinder drive means E for driving the zoom viewfinder 5 determines a photographing visual angle independently from the drive of the lens barrel 20. A change in the viewfinder magnification is set independently from the drive of the lens barrel at the photographing visual angles of wide W, wide-middle WM, middle M, tele-middle TM, tele T, tele-middle TM, middle M and wide-middle WM. Therefore, the drive is conducted in such a manner that a change in the viewfinder magnification can be small. Alternatively, when a change in the viewfinder magnification is stopped for a predetermined period of time at a point of the determined photographing visual angle, it is easy to set at a desired photographing visual angle.

Figure 14:
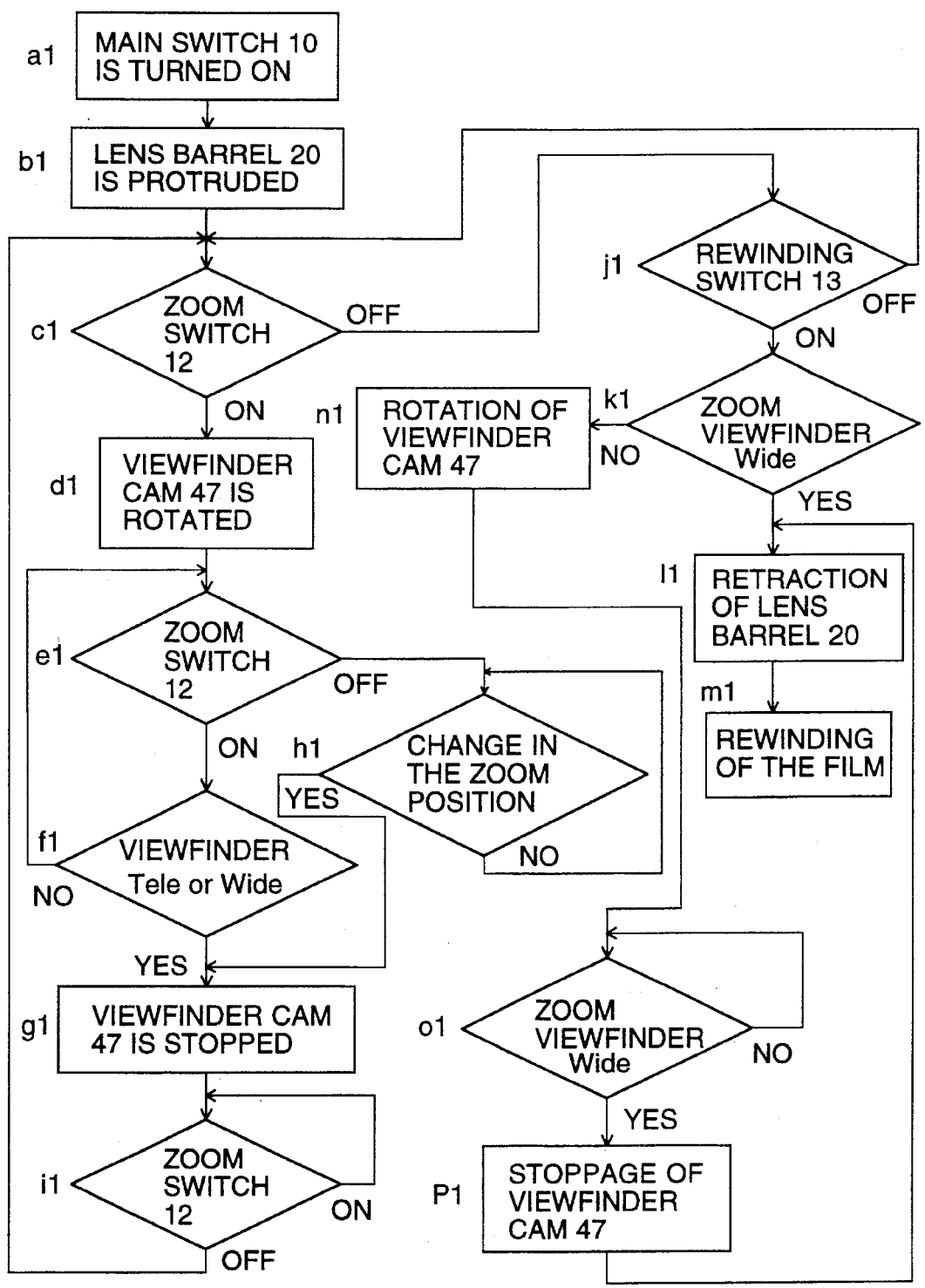
FIG. 14 is an operational flow chart of the camera having a trimming function.
Figure 15:
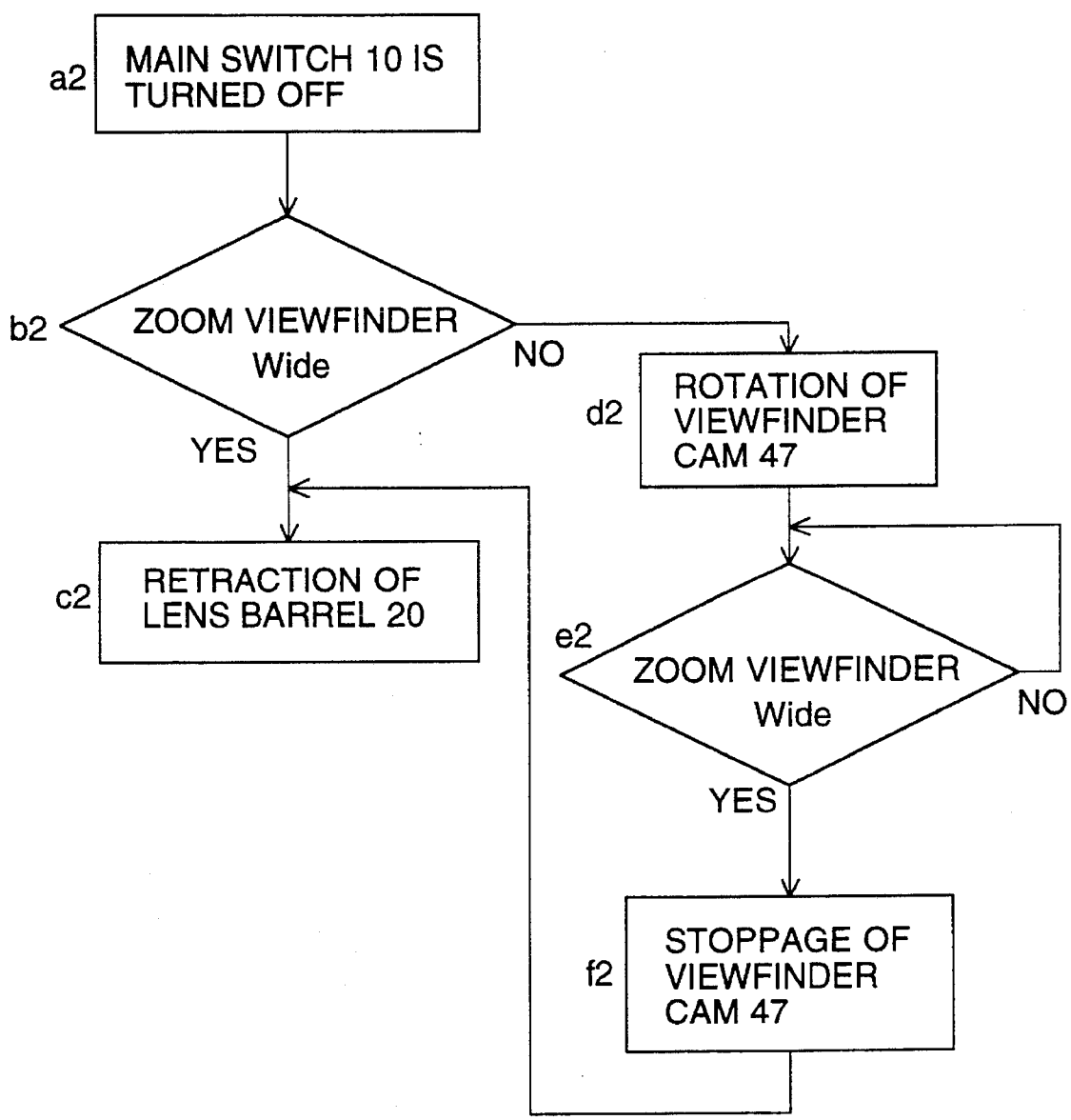
FIG. 15 is an operational flow chart of the camera having a trimming function.
Figure 16:
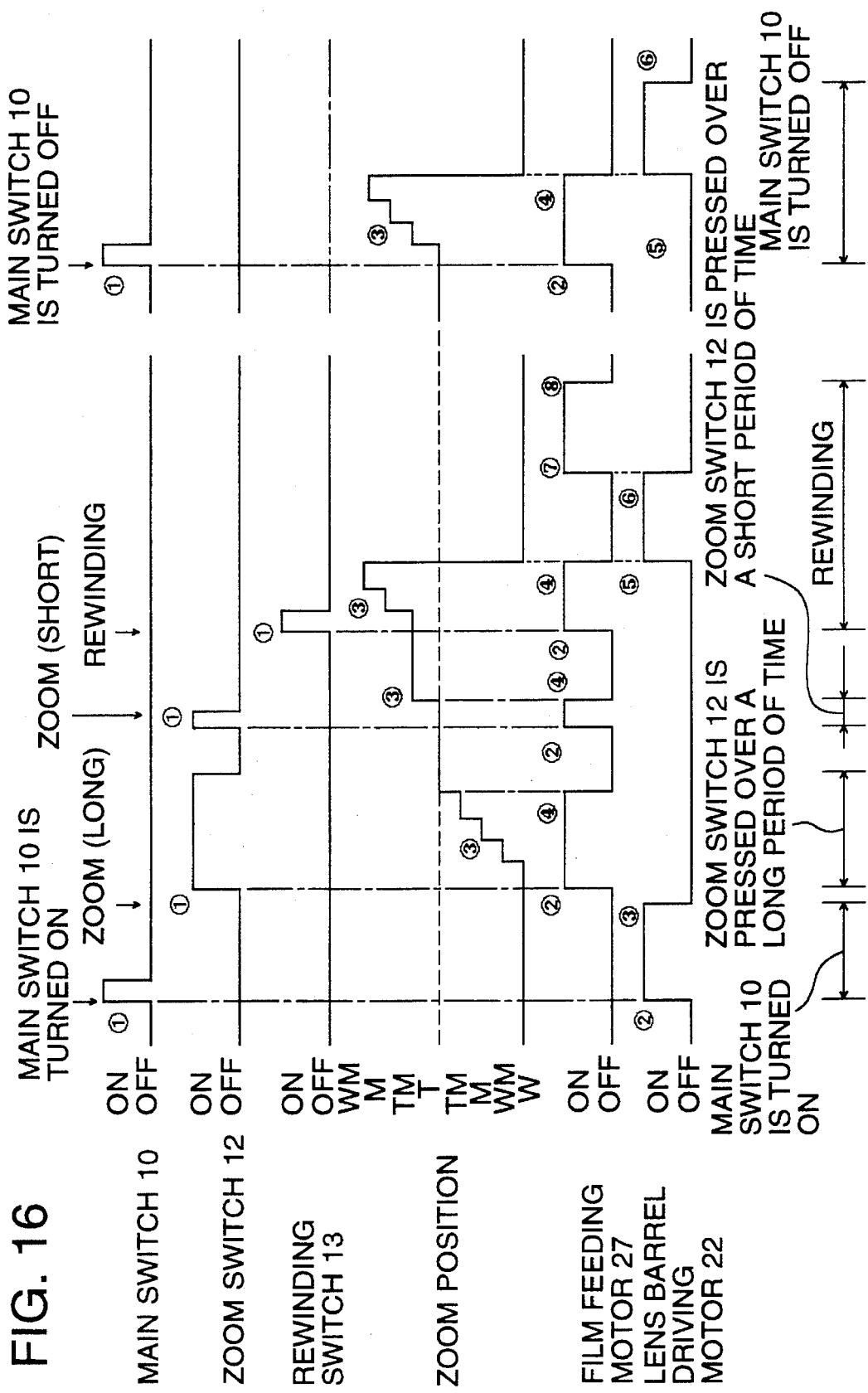
FIG. 16 is an operational timing chart of the camera having a trimming function.

With reference to FIGS. 14 to 16, the operation of this camera having a trimming function will be described as follows. FIGS. 14 and 15 are operational flow charts of the camera having a timing function, and FIG. 16 is an operational timing chart of the camera having a timing function.

In the flow chart illustrated in FIG. 14, when the main switch 10 is turned on in step a1 under the condition that the camera is turned off, the lens barrel drive motor 22 is driven in step b1, so that the lens barrel 20 is protruded by the lens barrel drive means A. In step c1, the condition of the zoom switch 12 is judged. When the zoom switch 12 is turned on, the film motor 27 is driven in step d1, and the viewfinder cam 47 is rotated by the film feed mean D, switching means F and viewfinder drive means E. In step e1, the condition of the zoom switch 12 is judged. When the zoom switch 12 is turned on in step e1, it is judged in step f1 whether the viewfinder is "tele or wide". In the case where "tele or wide", the rotation of the viewfinder cam 47 is stopped in step g1.

When the zoom switch 12 is turned off in step e1, the program advances to step h1, and a change in the zoom position is judged. When the zoom position is changed, the program advances to step g1, and the rotation of the viewfinder cam 47 is stopped. When the rotation of the viewfinder cam 47 is stopped, the OFF condition of the zoom switch 12 is judged in step i1, and the program advances to step c1.

Further, in the case where the zoom switch 12 is turned off in step c1, the rewinding switch 13 is turned on in step j1, and it is judged in step k1 whether the zoom viewfinder is wide or not. In the case where the zoom viewfinder is wide, the lens barrel 20 is retracted by the lens barrel drive means A in step l1, and the film is rewound by the film feed means D, switching means F and film rewinding means C in step m1.

In the case where the zoom viewfinder is not wide in step k1, the viewfinder cam 47 is rotated in step n1, and when the zoom viewfinder becomes wide in step o1, the rotation of the viewfinder cam 47 is stopped in step p1. Then, the program advances to step l1.

on the other hand, when the main switch 10 is turned off in the case where the camera is in an ON-condition in step a2 in the flow chart shown in FIG. 15, it is judged in step b2 whether or not the zoom viewfinder is a wide position. In the case where the zoom viewfinder is the wide position, the lens barrel 20 is retracted by the lens barrel drive means A in step c2, so that the camera is put into an OFF-condition. In the case where the zoom viewfinder is not located at a wide position in step b2, the viewfinder cam 47 is rotated in step d2, and the viewfinder cam 47 is moved to the wide position in step e2. After the viewfinder cam 47 has been moved to the wide position, the rotation of the viewfinder cam 47 is stopped in step f2, and the program advances to step c2.

In this example, the camera having a picture-taking lens of a single focus is described above. However, the same effect can be provided in the case where a zoom lens barrel and a zoom viewfinder usable for a predetermined visual angle are linked by a cam as illustrated in FIGS. 12 and 13.

Figure 17:
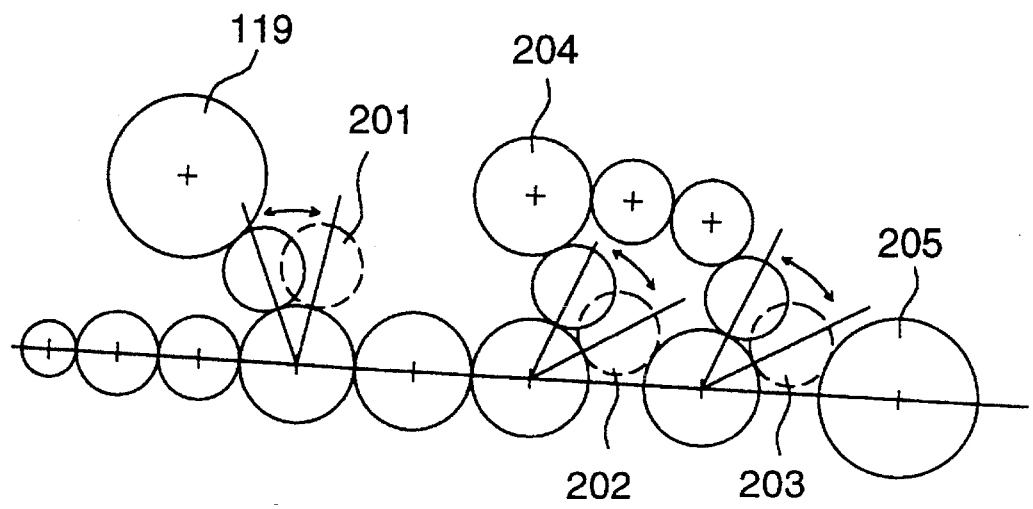
FIG. 17 is a view showing a gear train by which a film tongue is sent outside of a film magazine when a spool is rotated.

Another example is shown in FIG. 17. A gear train for feeding a film tongue to the outside from the film magazine by rotating the spool, includes a reel 119, planetary gears 201, 202 and 203, feeding and rewinding gear 204, and trimming drive means 205. This trimming drive means drives the zoom viewfinder, and switches the viewfinder visual field frame 206 and the exposure frame 207.

Figure 18:
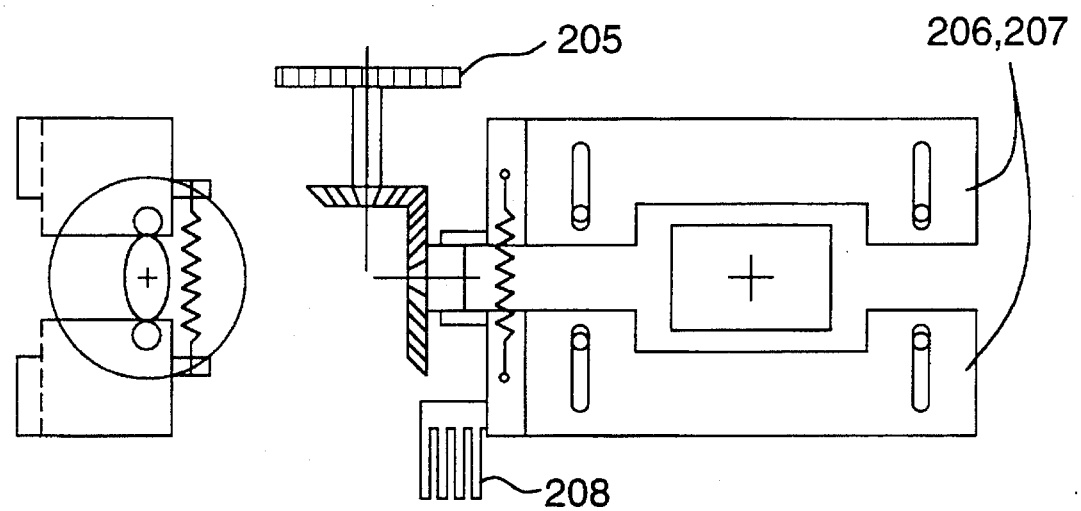
FIG. 18 is a schematic illustration showing an example of the switching of a viewfinder frame and the switching of an image frame.

Still another example is illustrated in FIG. 18. In this example, the switching of the viewfinder visual field frame 206 is shown, and also the switching the exposure frame 207 is shown. In this example, the positional detection is conducted using the positional detection armature 208, and the viewfinder visual field frame and the exposure frame can be switched into not less than 3 ways shown below by the same mechanism. They are a full size (24×36 mm), panoramic size (12×36 mm), and high vision size (21×36 mm).

Figure 19:
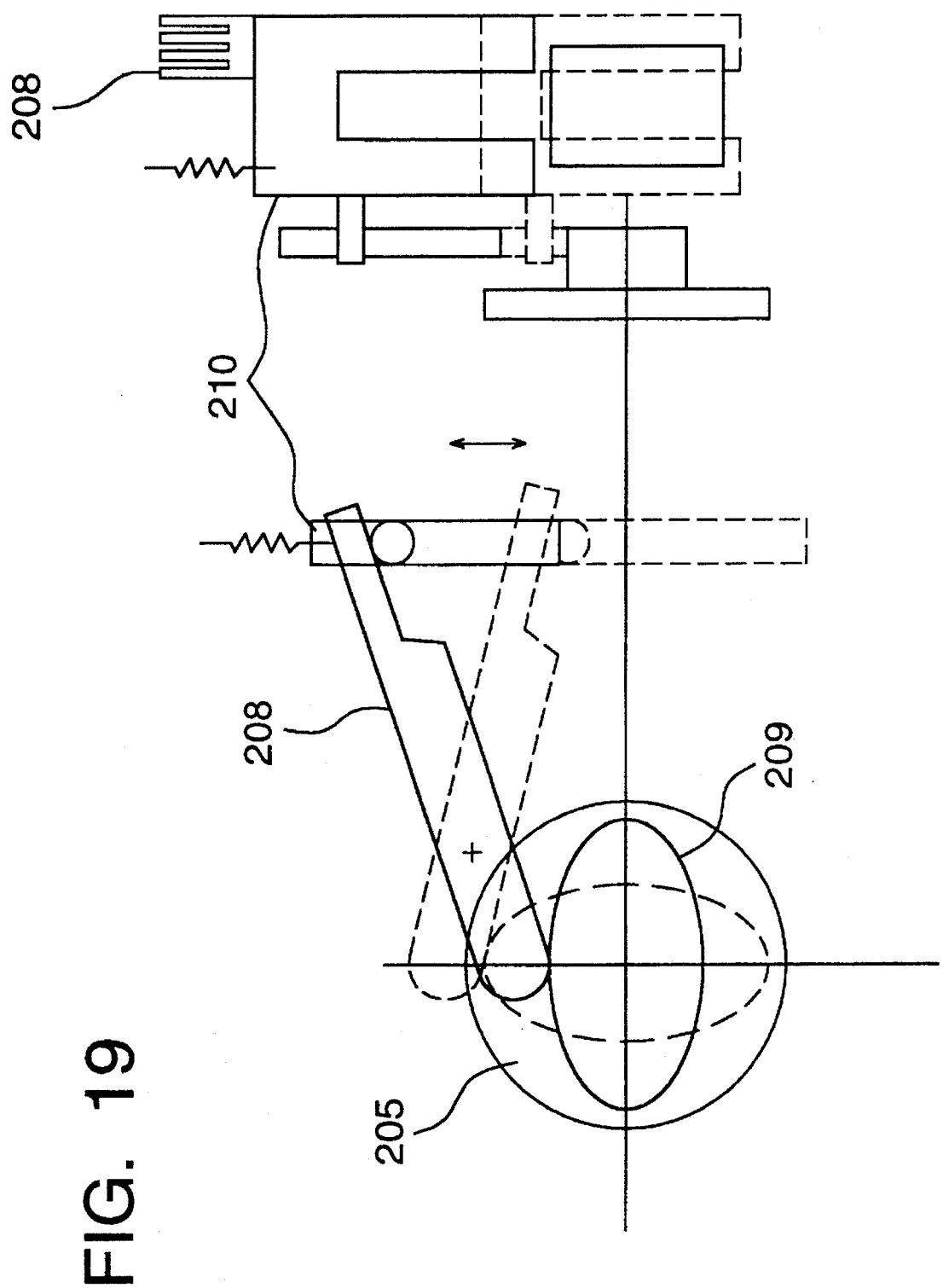
FIG. 19 is a schematic illustration showing another example of the switching of the viewfinder frame.

Further, still another example of the switching of the viewfinder visual field frame 206 is illustrated in FIG. 19. In the same manner as that of the example shown in FIG. 18, the positional detection armature 208 and the cam 209 are provided. Therefore, the following 2-way switching can be carried out. In the drawing, numeral 210 is a panoramic frame of the viewfinder.

Full size⇌Panoramic size

Full size⇌High vision size

High vision size⇌Panoramic size

As described above, according to the present invention, when the lens barrel is protruded, it is possible to connect the drive means having a motor to be used as a drive source, with the zoom viewfinder drive means by the switching means. Accordingly, the variable magnification drive of the zoom viewfinder can be conducted by the action of the drive means. In the case where the lens barrel is retracted, the drive means can be connected with the film rewinding means by the action of the switching means. Accordingly, the film rewinding drive can be conducted by the action of the drive means. Therefore, an exclusive drive source for the zoom viewfinder is not required, and the dimensions of the apparatus can be made small.

Also, the film feed mechanism is provided astride the exposure image surface, and the lens barrel is protruded and retracted in the front of the exposure surface. Therefore, the lens barrel and the film feed mechanism are located very close to each other, and when a portion of the drive means is activated in accordance with the position of the lens barrel, the connection of the drive system is changed so that a selection can be made between the film rewinding drive and the zoom viewfinder drive. Therefore, the mechanical efficiency can be improved. Further, the film rewinding drive is conducted only when the lens barrel is located in a retracting position. Consequently, a photographer can easily recognize the completion of photography.

Furthermore, according to the present invention, in the variable magnification range of the zoom viewfinder, the variable magnification operation is temporarily stopped or the variable magnification is reduced in the proximity of the trimming photographing position. Therefore, a trimming range which can be set is visually recognized, and a desired trimming range can be easily set.

What is claimed is:

1. A camera having a trimming function capable of recording trimming information, said camera comprising:
   (a) a picture-taking lens capable of moving between protruding and retracting positions;
   (b) a zoom viewfinder;
   (c) zoom viewfinder drive means for changing magnification of said viewfinder;
   (d) film winding means for winding film stored in said camera;
   (e) film rewinding means for rewinding the film;
   (f) a film feed motor;
   (g) drive means for driving said film winding means when said film feed motor rotates in a forward direction, and also for driving either said film rewinding means or said zoom viewfinder drive means when said film feed motor rotates in a reverse direction;
   (h) switching means for switching said drive means between drive of said zoom viewfinder drive means and drive of said film rewinding means; and
   (i) control means for controlling drive of said film rewinding means by rotating said film feed motor in the reverse direction when said switching means switches said drive means to drive said film rewinding means, and for controlling drive of said zoom viewfinder drive means by rotating said film feed motor in the reverse direction when said switching means switches said drive means to drive said zoom viewfinder drive means.

2. The camera of claim 1, wherein when said picture-taking lens is in the protruding position, said control means controls drive of one of said film rewinding means and said zoom viewfinder drive means so that said film feed motor drives a member other than said zoom viewfinder drive means to set either a visual field frame of said zoom viewfinder or an exposure frame corresponding to several photographing formats.

3. The camera of claim 2, wherein the several photographing formats are of a full size, panorama size or a high vision size.

4. The camera of claim 1, wherein said picture-taking lens is a single focus lens.

5. The camera of claim 1 further comprising a lens barrel having said picture-taking lens, and lens barrel drive means for driving said lens barrel.

6. The camera of claim 5, wherein said switching means switches between said zoom viewfinder drive means and said film rewinding means according to a position of said lens barrel, and wherein said control means controls drive of said film rewinding means by rotating said film feed motor in the reverse direction when said lens barrel is in a retracting position, and controls drive of said zoom viewfinder drive means by rotating said film feed motor in the reverse direction when said lens barrel is in a protruding position.

7. A camera having a trimming function capable of recording trimming information, said camera comprising:
   (a) a picture-taking lens capable of moving between protruding and retracting positions;
   (b) a zoom viewfinder;
   (c) a visual field frame of said zoom viewfinder corresponding to several photographing formats;
   (d) visual field frame drive means for driving said visual field frame;
   (e) film winding means for winding film stored in said camera;
   (f) film rewinding means for rewinding the film;
   (g) a film feed motor;
   (h) drive means for driving said film winding means when said film feed motor rotates in a forward direction, and for driving either said film rewinding means or said visual field frame drive means when said film feed motor rotates in a reverse direction;
   (i) switching means for switching said drive means between drive of said film rewinding means and drive of said visual field frame drive means; and
   (j) control means for controlling drive of said film rewinding means when said switching means switches said drive means to drive said film rewinding means, and for controlling drive of said visual field frame drive means when said switching means switches said drive means to drive said visual field frame drive means.

8. The camera of claim 7, wherein the several photographing formats are of a full size, panorama size or a high vision size.

9. The camera of claim 7, wherein said picture-taking lens is a single focus lens.

10. The camera of claim 7 further comprising a lens barrel having said picture-taking lens, and lens barrel drive means for driving said lens barrel.

11. The camera of claim 10, wherein said switching means switches between said film rewinding means and said visual field frame drive means according to a position of said lens barrel, and wherein said control means controls drive of said film rewinding means by rotating said film feed motor in the reverse direction when said lens barrel is in a retracting position, and controls drive of said visual field frame drive means by rotating said film feed motor in the reverse direction when said lens barrel is in a protruding position.

12. A camera having a trimming function capable of recording trimming information, said camera comprising:

(a) a picture-taking lens capable of moving between protruding and retracting positions;

(b) an exposure frame corresponding to several photographing formats;

(c) exposure frame drive means for driving said exposure frame;

(d) film winding means for winding film stored in said camera;

(e) film rewinding means for rewinding the film;

(f) a film feed motor;

(g) drive means for driving said film winding means when said film feed motor rotates in a forward direction, and for driving either said film rewinding means or said exposure frame drive means when said film feed motor rotates in a reverse direction;

(h) switching means for switching said drive means between drive of said film rewinding means and drive of said exposure frame drive means; and (i) control means for controlling drive of said film rewinding means when said switching means switches said drive means to drive said film rewinding means, and for controlling drive of said exposure frame drive means when said switching means switches said drive means to drive said exposure frame drive means.

13. The camera of claim 12, wherein the several photographing formats are of a full size, panorama size or a high vision size.

14. The camera of claim 12, wherein said picture-taking lens is a single focus lens.

15. The camera of claim 12 further comprising a lens barrel having said picture-taking lens, and lens barrel drive means for driving said lens barrel.

16. The camera of claim 15, wherein said switching means switches between said film rewinding means and said exposure frame drive means according to a position of said lens barrel, and wherein said control means controls drive of said film rewinding means by rotating said film feed motor in the reverse direction when said lens barrel is in a retracting position, and controls drive said exposure frame drive means by rotating said film feed motor in the reverse direction when said lens barrel is in a protruding position.

* * * * *